United States Patent [19]

Rai

[11] 3,984,736

[45] Oct. 5, 1976

[54] LEAKAGE PROTECTIVE DEVICE

[76] Inventor: Thin Fay Rai, 81, Fu Hsing Road, Sec. 2, South District, Taichung, Taiwan, China /Taiwan

[22] Filed: Feb. 4, 1975

[21] Appl. No.: 546,884

[52] U.S. Cl. .............................. 317/18 D; 335/18; 335/181; 335/15; 317/58
[51] Int. Cl.² ........................................ H02H 3/28
[58] Field of Search ................ 317/18 D, 18 R, 58; 335/18, 181, 170, 172, 173, 174, 175, 7, 8, 13, 15; 200/6 R, 6 BB, 7

[56] References Cited
UNITED STATES PATENTS

| | | | |
|---|---|---|---|
| 3,213,321 | 10/1965 | Dalziel | 317/18 D |
| 3,382,410 | 5/1968 | Grimm | 317/18 R |
| 3,440,580 | 4/1969 | Molenaar | 335/18 |
| 3,566,189 | 2/1971 | Wilson et al. | 335/18 X |
| 3,806,845 | 4/1974 | Zubaty et al. | 335/18 |
| 3,855,502 | 12/1974 | Pardue et al. | 335/18 X |

Primary Examiner—J D Miller
Assistant Examiner—Patrick R. Salce

[57] ABSTRACT

The present invention relates to an assembly of protective device and more particularly to an assembly of a leakage detective device with a no-fuse breaker, and an actuating mechanism, using the no-fuse breaker as the interrupter of the leakage protective device to interrupt the malfunction circuit of leakage current by virtue of its large interrupting capacity to maintain the electrical safety.

1 Claim, 3 Drawing Figures

LEAKAGE PROTECTIVE DEVICE

BACKGROUND OF THE INVENTION

The interrupter of leakage protective device is conventional electrical equipment having mainly an electromagnetic breaker or a general breaker without sufficient interrupting capacity. When the leakage current in an electrical equipment is detected by means of a Zero Current Transformer (Z.C.T.), the said leakage current is amplified by an electronic device and further energizing the coil of an attached relay to open the contacts of said relay. Than the magnetic coil of the said magnetic switch is deenergized and the main contacts can be opened by virtue of the spring element in the magnetic switch, the power source thus being cut off. This electromagnetic switch can only open the load current in the electric equipment, when a short circuit malfunction occurs, its current reaches a very high, several hundred amperes for instance, which is beyond the interrupting capacity of a conventional electromagnetic switch. Therefore a no-fuse breaker with sufficient interrupting capacity is needed to be installed before the electromagnetic switch as the interrupter for protecting the circuit, the power source and leakage protective device; otherwise, the electromagnetic switch will be burned up when a short circuit malfunction takes place. However, installing a no-fuse breaker not only increases the cost but also involves a large installation.

Furthermore, an A.C. source is normally used by conventional electromagnetic switch, it is easy to get hot and produce loud noises. As the voltage approximates a sine wave of A.C., the main contacts are usually moved creepingly and in an unstable manner. That is the biggest defect.

SUMMARY OF THE INVENTION

The primary object of the present invention is to provide a protective assembly of an interrupter of a leakage detective device with a no-fuse breaker and an actuating mechanism.

A secondary object of the present invention is to provide a leakage protective assembly using a lever of the said actuating mechanism to pull a trip arm of the no-fuse breaker and to cut off the main contacts of said breaker thereof. According to the construction of the present invention, when an actuation coil of said detective device is energized, a release means on the external side of a tractive means of said actuating mechanism is first attracted and said release means can pull lightly the said tractive means with merely a small force through a lever action, then, the tractive means pulls the trip arm of the no-fuse breaker, the main contacts of said breaker thus can be opened.

Another object of the present invention is to provide a leakage protective assembly used in two lines of single phase 110V; 220V; three lines power of single phase 110/220V, and three phase 220V power supply system.

Still another object of the present invention is to provide a compact, sensitive and accurate leakage protective assembly.

Still further object of the present invention is to provide a leakage protective assembly substantially having a leakage detective device with a no-fuse breaker, wherein, the leakage current is detected by said leakage detective device which can be adjusted from 30MA to 100MA.

The above and other objects and advantages of the present invention will become more apparent from the following description of preferred embodiments, reference being made to the accompanying drawings, in which:

BRIEF DESCRIPTION OF THE DRAWINGS

As shown in FIG. 1, the present invention is mainly composed of a leakage detective device 10, an actuating mechanism 20 and a no-fuse breaker 30. Wherein, said leakage detective device has a zero current transformer (ZCT) 101 for detecting the leakage current in the electric equipment. An adjustable rheostat 102 is attached to said ZCT 101 for controlling the parameter of the electronic amplifier 103, and a power transformer 104 has a primary coil 104A with a pilot lamp 107 and a secondary coil 104B. Two relays 105, 106 are arranged after the out-put terminal of said electronic amplifier 103, an action coil 111 is connected to the contacts of said second relay 106 and a switch 114, a fuse 108, an indicating lamp 109 with a buzzer 110 are also provided in the circuit. Said actuating mechanism 20 will be further described in the description of FIG. 2 and as said no-fuse breaker 30 is the same as that of the conventional a description is thus omitted.

Figure 1:
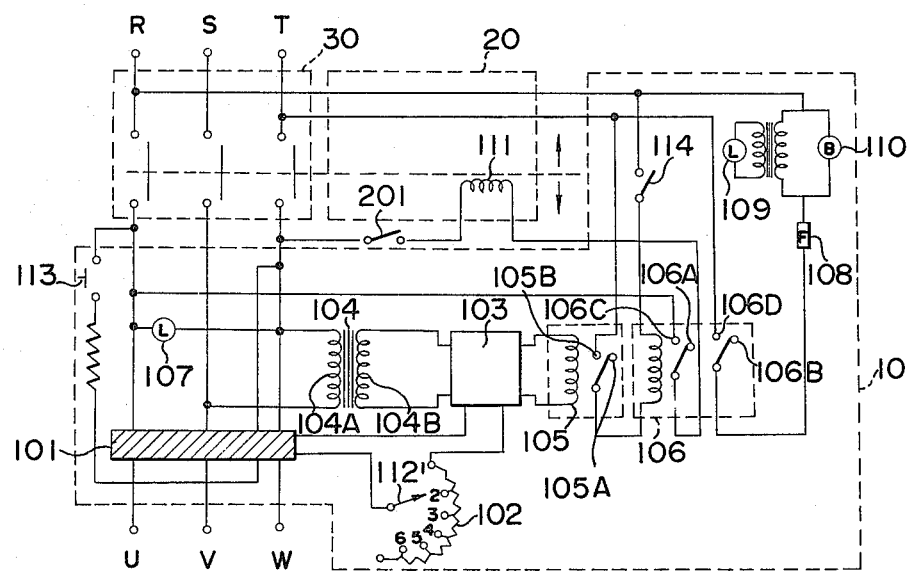
FIG. 1 is the circuit diagram of the present invention.

As actually required for operation, the adjustment arm 112 of the said adjustable rheostat 102 is first turned to the place of operating current needed, for example, at the contact No. 2. When the leakage current reaches the predetermined value at the contact No. 2, the contact 105A of the first relay 105 will be changed to another contact 105B by virtue of the amplifier 103, then, the second relay 106 is energized, the contacts 106A, 106B of said relay 106 will be changed to contacts 106C, 106D thereof, and the buzzer alarm 110 with the indicating lamp 109 are both actuated. At the same time, the action coil 111 is energized, to actuate said actuating mechanism, and a trip arm of the no-fuse breaker 30 is pulled by a lever of said actuating mechanism to make said breaker 30 to trip to interrupt the circuit for the purpose of protecting the personnel and the equipment.

The protective switch 201 shown in FIG. 1 is to cut off the action coil 111, relay 106 with indicating lamp 109 and the buzzer 110. Therefore, before the elimination of causes of malfunction, it will be impossible to close the no-fuse breaker 30, which will instantaneously be re-tripped with its handle striking the palm of the operator. Hence, the said protective switch 201 must be first cutoff to de-energize the trip circuit, then after closing the no-fuse breaker 30, the protective switch 201 will be closed again, if the causes of leakage has not yet been eliminated, the re-trip of the no-fuse breaker 30 will not hurt the operator. Again, when the button switch 113 is pressed, the rating voltage and the detected leakage current 220V, 100MA for instance will be changed into 110V, 50MA, the current value of leakage current and the rating voltage will be changed, and also the functions of this invention can be tested any time. If the fuse 108 in FIG. 1 is burned, it shows that the circuit of the buzzer 110 is either short circuit or open circuit.

Figure 2:
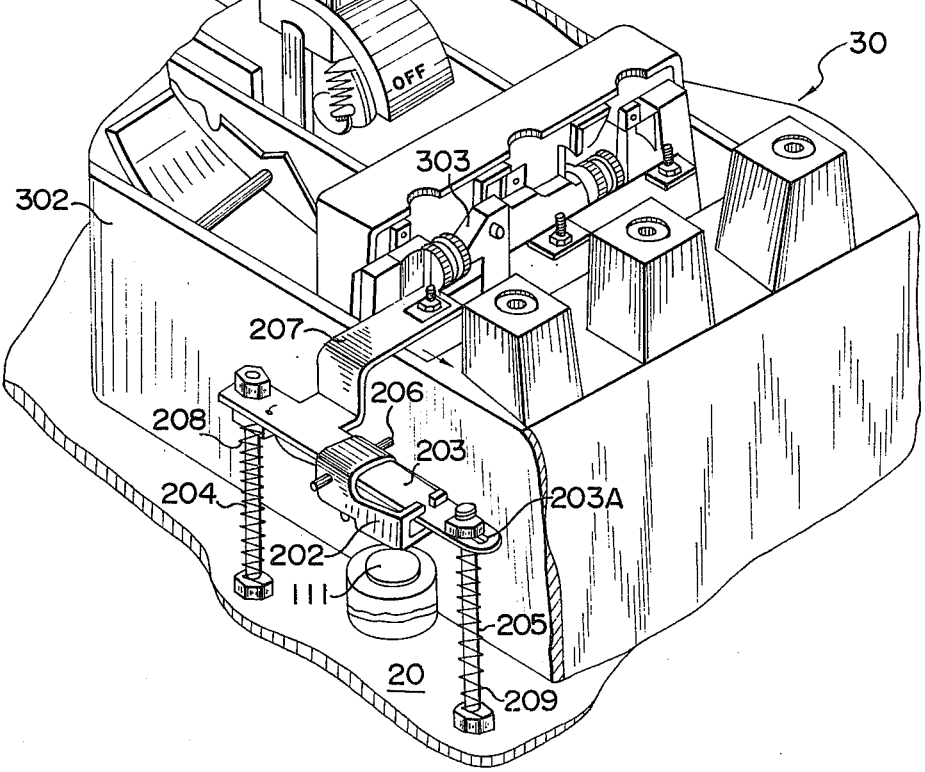
FIG. 2 is a perspective view of the trip mechanism of the first embodiment according to the present invention.

Referring now to FIG. 2, the first embodiment of the actuating mechanism 20 according to the present invention is designed in conjunction with the structure of a no-fuse breaker 30 over 300 ampere in rating value of said breaker, consisting of an action coil 111, a release means 202, a tractive means 203, two supporting bolts 204 and 205, and a trip arm 303 attached to the no-fuse breaker 30. Said release means 202 is mounted on the top of said action coil 111, the rear end of said release means 202 is fixed at the bottom of the tractive means 203 by a pin 206. One end of the tractive means 203 is fixed on one supporting bolt 204, under the bottom side of said tractive means and a spring 208 is overlapped to said bolt 204 to fix the movable tractive means 203. The other end of the tractive means 203 is formed a slot 203A enclosing the other bolt 205 with a spring 209 for guiding the movement of said means 203 to an accurate direction, while a lever 207 extending outward at the middle of said tractive means 203 passes through a hole formed in the housing case 302 of the no-fuse breaker 30 and is connected at the trip arm 303 of said no-fuse breaker 30 to pull said arm 303 to trip the main contacts (not shown) of the no-fuse breaker 30.

When a leakage current is detected by the Z.C.T. 101 of the leakage detective device 10, said action coil 111 is energized through the amplifier 103, relays 105, 106 to produce magnetism and attract said release means 202 with said tractive means 203. The provision of said release means 202 is using the lever principle of a pin 206 as an actuating fulcrum to render the tractive means 203 moving more sensitively, only a small moment is needed to lightly pull the movable tractive means 203. When said means 203 is attracted and inclined, the lever 207 pulls said trip arm 303 backward to make the latter inclined, then the main contacts of said no-fuse breaker 30 is released and interrupts the circuit with its own trip mechanism.

Figure 3:
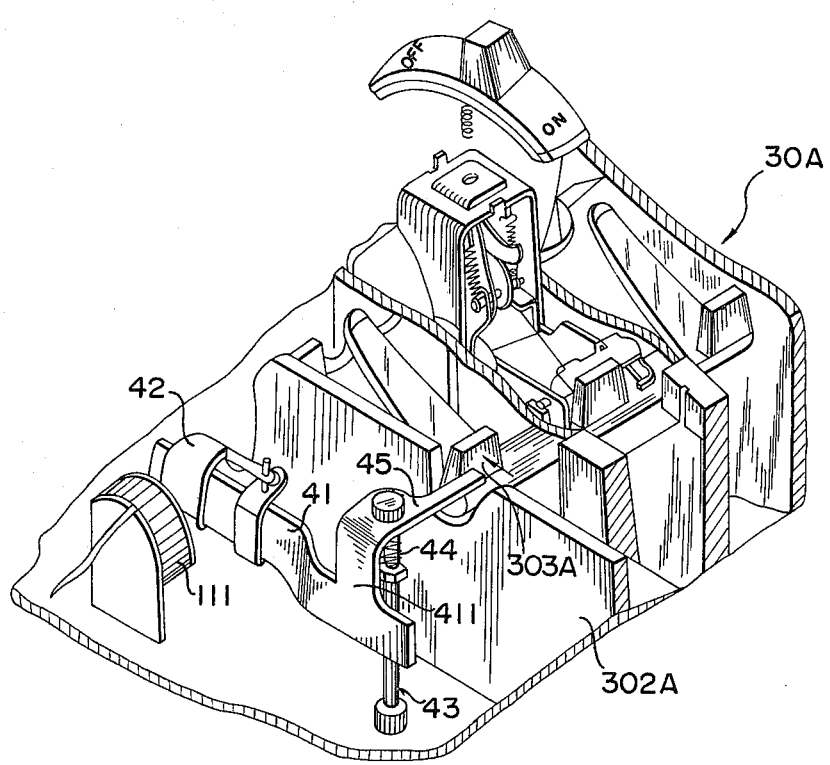
FIG. 3 is a perspective view of the trip mechanism of the second embodiment according to the present invention.

The second embodiment of the actuating mechanism as shown in FIG. 3 is designed to match the structure of a no-fuse breaker under 300A rating capacity, wherein, a movable tractive means 41, a release means 42, a fixing bolt 43, and a trip arm 303A of the no-fuse breaker 30A are arranged in the actuating mechanism.

The action coil 111 is opposite to one end of the tractive means 41. Of course, the release means 42 mounted between the inner side of the movable tractive means 41 and the action coil 111 is also to increase the sensitivity of said tractive means 41. The vertical portion 411 of said tractive means 41 is fixed at a bolt 43, said bolt 43 serves as the rotational pivot with a spring 44, a lever 45 integrally connected to said tractive means 41 extends into the housing case 302A of the said no-fuse breaker 30A and is in an opposite position with the trip arm 303A of said no-fuse breaker 30A.

When a leakage current is detected by Z.C.T. 101, the action coil 111 is energized (relevant description as per FIG. 1) and magnetism is produced to attract the release means 42 and the movable tractive means 41, said movable means 41 is rotated thereof around the bolt 43; therefore, the lever 45 is pushing and pressing the trip arm 303A of the no-fuse breaker 30A, then the main contacts (not shown) of said breaker 30A will be opened to interrupt the power supply circuit.

It can be understood that the feature of the present invention is to provide a leakage protective device composed of a conventional no-fuse breaker with a leakage detective device and an actuating mechanism. When the leakage current reaches the predetermined value, a Zero Current Transformer of the said detective device will detect the leakage current and further actuate an action coil through an electronic amplifier and a relay to actuate said actuating mechanism and further to open the circuit of said no-fuse breaker.

It should be noted that the present invention may be embodied into other specific forms without departing from its spirit or essential characteristics.

I claim:

1. A leakage current protective assembly composed of a leakage current detective device, an actuating mechanism and a conventional no-fuse breaker; characterized in that when the leakage current in an electric equipment reaches a predetermined level, said leakage current will be detected by said leakage current detective device, and an action coil will thus be energized by said detective device for attracting said actuating mechanism to actuate the trip mechanism of said no-fuse breaker to interrupt the circuit thereof, wherein, said actuating mechanism has a release means mounted against the action coil and fixed pivotedly at the middle portion of a tractive means by a pin; said tractive means having two ends horizontally positioned on two supporting bolts and having a lever extending into the no-fuse breaker and to connect with the trip mechanism of said breaker.

* * * * *